United States Patent
Chavan et al.

(10) Patent No.: US 10,241,979 B2
(45) Date of Patent: Mar. 26, 2019

(54) ACCELERATED DETECTION OF MATCHING PATTERNS

(71) Applicant: Oracle International Corporation, Redwood Shores, CA (US)

(72) Inventors: Shasank Chavan, Menlo Park, CA (US); Ravi Palakodety, Sunnyvale, CA (US); Dennis Lui, San Jose, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 367 days.

(21) Appl. No.: 14/805,414

(22) Filed: Jul. 21, 2015

(65) Prior Publication Data
US 2017/0024439 A1 Jan. 26, 2017

(51) Int. Cl.
*G06F 17/30* (2006.01)
*G06F 17/22* (2006.01)

(52) U.S. Cl.
CPC .................. *G06F 17/2217* (2013.01)

(58) Field of Classification Search
CPC ........... G06F 17/30495; G06F 17/2765; G06F 17/2217; G06F 17/30277; G06F 17/30371; G06F 17/30466; G06F 17/30486; G06F 17/30489; G06F 17/30539; G06F 17/3056; G06F 17/30569; G06F 17/30598; G06F 17/30; G06F 19/22; G06F 17/30501; G06F 17/30129; G06F 17/30315; G06F 17/30563; G06F 9/5038; G06F 17/30286; H03M 7/42
See application file for complete search history.

(56) References Cited

U.S. PATENT DOCUMENTS

| 5,287,275 | A | * | 2/1994 | Kimura | ................. | G06K 9/685 |
| | | | | | | 707/E17.005 |
| 5,835,964 | A | * | 11/1998 | Draves | ................ | G06F 12/1036 |
| | | | | | | 711/207 |
| 7,031,994 | B2 | | 4/2006 | Lao et al. | | |

(Continued)

OTHER PUBLICATIONS

Knuth, Donald; Morris, James H.; Pratt, Vaughan (1977). "Fast pattern matching in strings". *SIAM Journal on Computing* 6 (2): 323-350. doi:10.1137/0206024, 28 pages.

(Continued)

*Primary Examiner* — Anh Ly
(74) *Attorney, Agent, or Firm* — Hickman Palermo Becker Bingham LLP

(57) ABSTRACT

Techniques related to accelerated detection of matching patterns are disclosed. In an embodiment, a method may involve, for a single field of a body of records, contiguously storing field values, thereby storing the field values as a concatenation. The method may also involve identifying a match in the concatenation that matches a value pattern specified by a value pattern expression. The value pattern may include a first partial pattern and a second partial pattern. Further, the method may involve determining that the match is contained in a single field value of the body of records. Still further, the method may involve establishing the match as a matching value. The match may be determined to be contained in the single field value based on searching a data structure comprising length information or offset information for a subset of the field values stored as the concatenation.

26 Claims, 9 Drawing Sheets

(56) References Cited

U.S. PATENT DOCUMENTS

| | | | |
|---|---|---|---|
| 7,496,589 B1 | 2/2009 | Jain et al. | |
| 8,832,142 B2 | 9/2014 | Marwah et al. | |
| 9,430,114 B1* | 8/2016 | Dingman | G06F 3/048 |
| | | | 707/E17.005 |
| 2001/0000536 A1* | 4/2001 | Tarin | G06F 17/30592 |
| | | | 707/754 |
| 2002/0073395 A1* | 6/2002 | Gartner | G06F 17/30607 |
| | | | 717/101 |
| 2005/0102325 A1* | 5/2005 | Gould | G06F 17/30466 |
| | | | 707/E17.045 |
| 2006/0106832 A1* | 5/2006 | Ben-Dyke | G06F 17/30327 |
| | | | 707/E17.004 |
| 2008/0014646 A1* | 1/2008 | Kuroda | G06F 19/16 |
| | | | 436/89 |
| 2008/0033895 A1* | 2/2008 | Sakurai | G06F 17/30988 |
| | | | 706/13 |
| 2008/0040345 A1* | 2/2008 | Cameron | G06F 7/02 |
| | | | 707/E17.039 |
| 2008/0059412 A1* | 3/2008 | Tarin | G06F 17/30592 |
| | | | 707/E17.014 |
| 2009/0006399 A1* | 1/2009 | Raman | G06F 17/30498 |
| | | | 707/E17.046 |
| 2009/0043943 A1* | 2/2009 | Hutson | G06F 12/0607 |
| | | | 711/5 |
| 2010/0011031 A1* | 1/2010 | Huang | G06F 21/552 |
| | | | 707/E17.007 |
| 2010/0057737 A1* | 3/2010 | Srinivasan | G06K 9/62 |
| | | | 707/E17.039 |
| 2011/0225173 A1* | 9/2011 | Gulhane | G06K 9/3266 |
| | | | 707/749 |
| 2012/0016901 A1* | 1/2012 | Agarwal | G06F 17/30569 |
| | | | 707/769 |
| 2013/0031061 A1* | 1/2013 | Jagota | G06Q 10/10 |
| | | | 707/690 |
| 2013/0060780 A1* | 3/2013 | Lahiri | H03M 7/3088 |
| | | | 707/741 |
| 2013/0124466 A1* | 5/2013 | Naidu | G06F 17/30575 |
| | | | 707/610 |
| 2014/0304275 A1* | 10/2014 | Baskett | G06F 17/30315 |
| | | | 707/747 |
| 2015/0032684 A1* | 1/2015 | Gupta | G06F 17/30575 |
| | | | 707/600 |
| 2015/0178305 A1* | 6/2015 | Mueller | G06F 17/30129 |
| | | | 707/693 |
| 2017/0193012 A1* | 7/2017 | Gupta | G06F 17/30283 |
| | | | 707/E17.009 |
| 2017/0220482 A1* | 8/2017 | Sivaprakasam | G06F 12/1009 |
| | | | 707/E17.046 |

OTHER PUBLICATIONS

R. N. Horspool (1980). "Practical fast searching in strings". *Software—Practice & Experience* 10 (6): 501-506. doi:10.1002/spe.4380100608. CiteSeerX: 10.1.1.63.3421, 6 pages.

Ailamaki, Anastassia, et al, "Weaving Relations for Cache Performance," Proceedings of the 27$^{th}$ International Conference on Very Large Data Bases, Rome, Italy, Sep. 11-14, 2001, 14 pages.

Elmasri, et al., "Fundatmentals of Database Systems," Third Edition, Addison-Wesley Longman, Inc., Copyright © 2000, ISBN-0-8053-1755-4, pp. 32, 70, 118, 131-132, 134, 155-159, 170, 252-254, 558, 569-573, 591-592, and 789-790 (26 pgs).

* cited by examiner

ACCELERATED DETECTION OF MATCHING PATTERNS

FIELD OF THE DISCLOSURE

Embodiments relate to information retrieval technology and more specifically, to accelerated detection of matching patterns.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Pattern matching, such as text pattern matching, is a powerful technique for searching a data source, such as a database and/or a file. For example, using a fragment of a word, pattern matching may return a rich set of results that includes spelling variations, different conjugations of a verb, etc. However, as computer memory capacities increase, so does the amount of stored data. Thus, faster approaches for searching ever increasing amounts of data are beneficial and desirable.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order. For example, a second partial pattern may be so named although, in reality, it may correspond to a first, second, and/or third partial pattern.

General Overview

In an embodiment, detection of a matching pattern may be accelerated by searching a concatenation of discrete values as if the concatenation were, in effect, a single value. The discrete values may be values in a column. Once the matching pattern is detected, it is determined whether the matching pattern occurred within a single discrete value in the concatenation. The determination is based on boundary information defining the boundaries between discrete values in the concatenation.

In an embodiment, the matching pattern may include sub-patterns. The matching pattern may be detected based on searching for each sub-pattern separately.

Boundary information for the discrete values may be recorded separately. At least a beginning location and an ending location for the matching pattern may be mapped back to one or more discrete values based on the boundary information. When the beginning location and the ending location for the matching pattern are found in a same discrete value, information related to the same discrete value is returned.

Example Data Source

Figure 1:
FIG. 1 depicts an example data source.

FIG. 1 depicts an example data source. In the example of FIG. 1, body of records 100 comprises a plurality of fields 102A-Z and a plurality of records 106A-Z. Each of a plurality of field values 104A-Z corresponds to one of a plurality of fields 102A-Z and one of a plurality of records 106A-Z.

Body of records 100 may represent digital data that is organized in a structured format, such as a tabular format. Body of records 100 may be stored in a database, a configuration file, and/or any other system and/or data structure that stores data. For example, body of records 100 may be a table in a database or an electronic spreadsheet in persistent storage.

According to an embodiment, body of records 100 are rows in a database table and each of the plurality of fields 102A-Z is a column in the database table. Each of the plurality of field values 104A-Z may represent an alphanumeric string, binary data, and/or an instance of any other data type. In the example of FIG. 1, the plurality of field values in field 102B, field 102C, and field 102Z are words, an alphanumeric string, and numbers, respectively. Each of the plurality of field values 104A-Z in a single field may share a common data type. For example, each of the plurality of field values 104A-Z may correspond to a series of American Standard Code for Information Interchange (ASCII) characters.

Process Overview

Figure 2A:
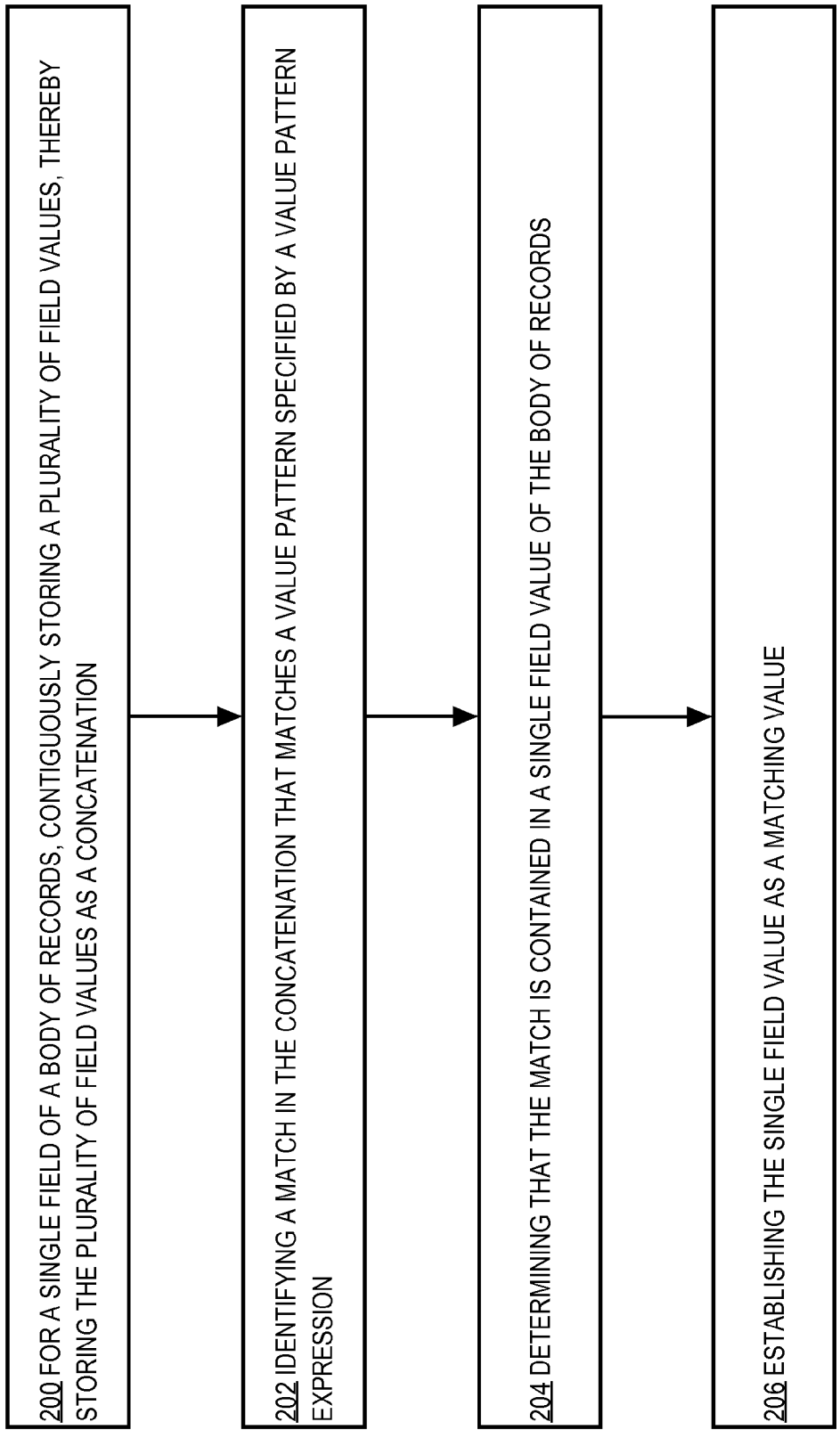
FIG. 2A is a flow diagram that depicts an approach for accelerated detection of one or more matching patterns based on searching a plurality of field values as if the plurality of field values were, in effect, a single field value.

In an embodiment, detection of one or more matching patterns may be accelerated by searching a plurality of field values in a single field as if the plurality of field values were, in effect, a single field value. Such an approach may reduce computational overhead, for example, by avoiding multiple executions of separately searching the plurality of field values. FIG. 2A is a flow diagram that depicts an approach for accelerated detection of one or more matching patterns based on searching a plurality of field values as if the plurality of field values were, in effect, a single field value.

At block 200, a plurality of field values are stored as a concatenation. The concatenation may be a plurality of field values that are stored together within an address space of a memory in a manner such that the plurality of field values may be treated a single value. Each of the plurality of field values may correspond to a single field of a body of records. Storing the concatenation may involve contiguously storing the plurality of field values. For example, in FIG. 1, the field values of field 102B may be contiguously stored to obtain the concatenation "CATDOGHORSEDOGCATMOUSE . . . HORSE".

At block 202, a match in the concatenation is identified. The match may include a portion that matches a value pattern. The value pattern may be a regular expression, a bit pattern, and/or any other series of instances of a particular data type. The value pattern may be specified by a value pattern expression. For example, the value pattern expression may be a Structured Query Language (SQL) statement, such as "SELECT * FROM table WHERE column LIKE '%ORS%'", that specifies the value pattern "%ORS%".

Any pattern-matching algorithm may be used to identify the match. Examples of pattern-matching algorithms include the Boyer-Moore-Horspool algorithm and the Knuth-Morris-Pratt algorithm.

At block 204, the match is determined to be contained in a single field value of the body of records. The determination may be based on a boundary mapping that indicates one or more respective boundaries for each of the plurality of field values. In an embodiment, the boundary mapping may include a cumulative length array (CLA) that stores a starting byte offset for a subset (e.g., all, some, none) of the plurality of field values. For example, the CLA for the concatenation of the field values in field 102 B of FIG. 1 may include "[3][6][11][14][17] . . . [97]". In this example, note that "[3]" indicates that "DOG" begins at byte offset "3", which may be used to mark a boundary between "CAT" and "DOG". Since the first entry in the concatenation may always begin at byte offset "0", "[0]" may be omitted as the first element of the CLA. "[6]" may be used to mark a boundary between "DOG" and "HORSE", "[11]" may be used to mark a boundary between "HORSE" and "DOG", and so on.

The match may be determined to be contained in a single field value based on comparing at least a beginning location and an ending location of the match to the information stored in the boundary mapping. If both the beginning location and the ending location of the match are found within the boundaries of a particular field value, the particular field value may be determined to correspond to the match. For example, a match for the value pattern "%ORS%" is identified in the concatenation of the field values in field 102 B of FIG. 1 at byte offsets "7-9". For the match, the beginning location is "7", and the ending location is "9". Based on comparing each of the beginning location and the ending location to the CLA, each of the beginning location and the ending location is determined to be contained in the third field value "HORSE". Specifically, the beginning location of "7" is determined to be contained in the third field value "HORSE", because "7" is greater than or equal to the starting byte offset "6" but less than the immediately subsequent starting byte offset of "11". The ending location of "9" is also determined to be contained in the third field value "HORSE", because "9" is greater than or equal to the starting byte offset "6" but less than the immediately subsequent starting byte offset of "11". Since both the beginning location and the ending location of the match are contained in the third field value, the match is determined to be contained in the third field value.

At block 206, the single field value is established as a matching value. In the previous example, the match was determined to be contained in the third field value, so the third field value "HORSE" is established as a matching value. Unless the end of the concatenation has been reached, block 206 may proceed to block 202 to find another matching value. In the example of FIG. 1, the twenty-sixth field value of field 102B is detected as another matching value.

Generating A Sequence of Partial Patterns

Figure 2B:
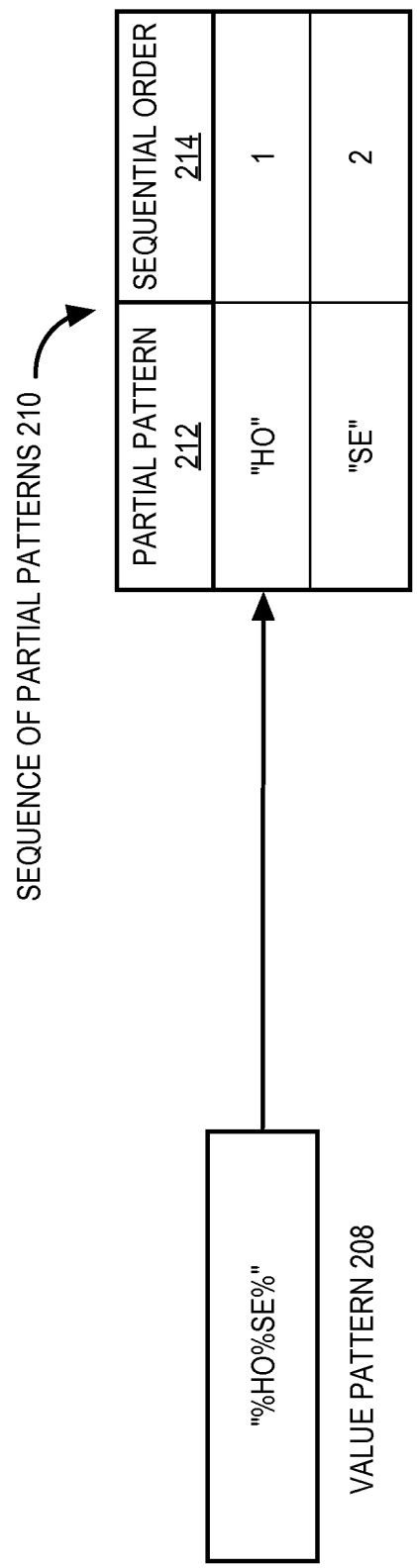
FIG. 2B depicts an example approach for generating a sequence of partial patterns based on a value pattern.

In an embodiment, pattern-matching algorithm may be based on generating a sequence of partial patterns based on a value pattern. FIG. 2B depicts an example approach for generating a sequence of partial patterns based on a value pattern. In the example of FIG. 2B, sequence of partial patterns 210 is generated based on value pattern 208. Sequence of partial patterns 210 comprises partial pattern 212 and sequential order 214.

Value pattern 208 may be specified by a value pattern expression, such as "find.-regextype sed-regex '.*/[a-f0-9\-]\{36\}\.jpg'" or a SQL statement including a "LIKE" clause. For example, in the SQL statement "SELECT * FROM table WHERE column LIKE '%HO%SE%'", value pattern 208 is "%HO%SE%". The value pattern expression may include more than one value pattern 208. For example, in the SQL statement "SELECT * FROM table WHERE column LIKE '%HO%SE%' or column LIKE '%SE%HO%'", a first value pattern may be "%HO%SE%", and a second value pattern may be "%SE%HO%". Value pattern 208 may include a conjunction of a plurality of partial patterns. For example, value pattern 208 may include a first partial pattern and a second partial pattern. Sequential order 214 for the plurality of partial patterns may be unspecified by value pattern 208. Alternatively, value pattern 208 may specify a sequential order 214 for the plurality of partial patterns.

In an embodiment, sequence of partial patterns 210 may be generated based on value pattern 208. Generating sequence of partial patterns 210 may involve resolving value pattern 208 into a plurality of partial patterns. Each of the plurality of partial patterns may be assigned an order according to sequential order 214 indicated by value pattern 208.

Partial pattern 212 may be resolved from value pattern 208. For example, a plurality of partial patterns may remain after removing one or more wildcard operators (e.g., "%", "_") and/or one or more quantifying metacharacters (e.g., "*", "+") from value pattern 208. In FIG. 2B, "HO" and "SE" are the partial patterns that remain after removing all the percent sign wildcard operators from value pattern 208.

Sequential order 214 may indicate an order in which each partial pattern 212 is to be encountered in a matching field value. Searches for each partial pattern 212 may be performed in sequential order 214. For example, a search for a first partial pattern may be performed until a match for the first partial pattern is found. Then, a search for a second partial pattern may be performed until a match for the second partial pattern is found.

Example Pattern-Matching Algorithm

Figure 3:
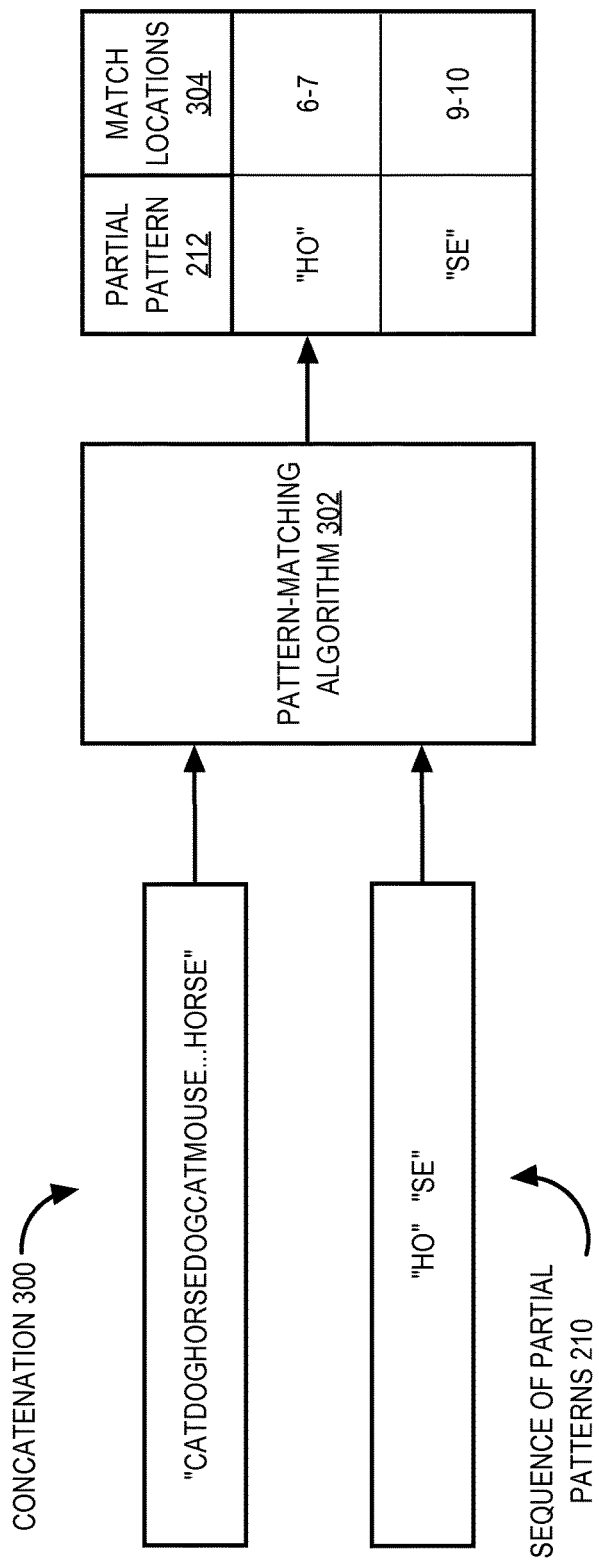
FIG. 3 depicts an example pattern-matching algorithm.

FIG. 3 depicts an example pattern-matching algorithm. In the example of FIG. 3, pattern-matching algorithm 302 receives input comprising concatenation 300 and sequence of partial patterns 210. Pattern-matching algorithm 302 generates output comprising match locations 304 corresponding to each partial pattern 212. The term contiguous refers to storing values contiguously within a memory address space.

In an embodiment, concatenation 300 may be obtained by storing a plurality of field values in a contiguous memory address space. Body of records 100 may store the plurality of field values in the contiguous memory address space. For example, when each of the plurality of field values is inserted and/or updated, data may be written to a section of digital memory that is allocated to values in field 102B. Additionally or alternatively, the plurality of field values may be stored in a separate data structure that is allocated a contiguous memory address space. For example, the plurality of field values may be copied from body of records 100 into an array. Concatenation 300 may be an in-memory data stream.

Pattern-matching algorithm 302 may be a string search algorithm, a bit-parallel algorithm, and/or any other algorithm that locates one or more matches for one or more patterns. Pattern-matching algorithm 302 may search for a first partial pattern until a match for the first partial pattern is found. Pattern-matching algorithm 302 may then begin searching for a second partial pattern at a location that immediately follows the match for the first partial pattern. For example, in FIG. 3, pattern-matching algorithm 302 may search from the beginning of concatenation 300 until byte-positions six and seven, where a match for "HO" is found. Pattern-matching algorithm 302 may then search from byte-position eight for "SE".

Match locations 304 may include a bit-position, a byte-position, and/or any other information that describes where a match is found. Match locations 304 may include all or some of the positions that match a partial pattern 212. In the example of FIG. 3, match locations 304 indicate a range of byte offsets. However, if length information for each partial pattern 212 is maintained, match locations 304 may include a single position (e.g., a starting position, an ending position) for each match. For example, in FIG. 3, match locations 304 may indicate byte offsets "6" and "9" for "HO" and "SE", respectively.

Maintaining Length and/or Offset Information

Figure 4:
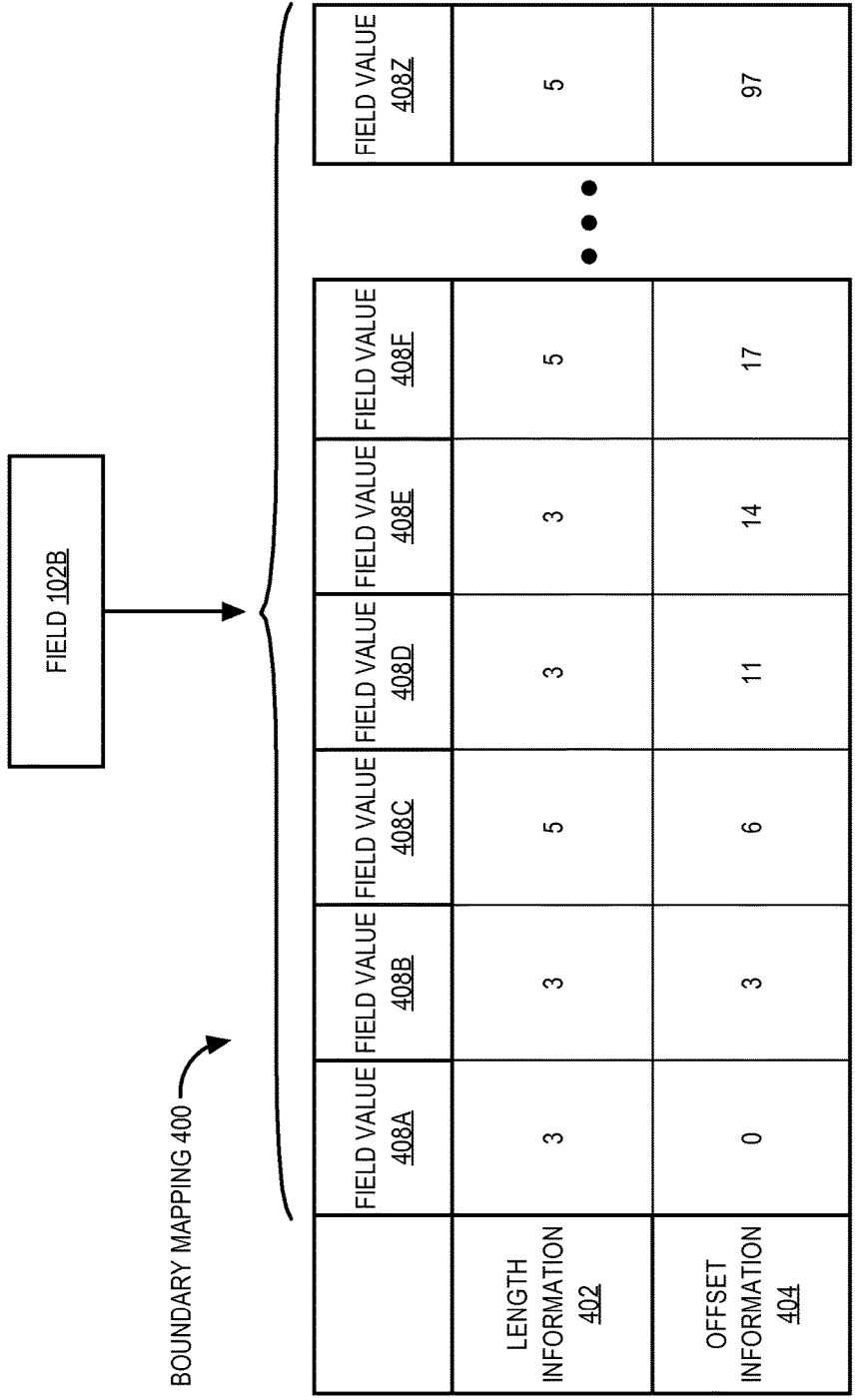
FIG. 4 depicts an example approach for generating a data structure comprising length and offset information.

Searching concatenation 300 may involve less computational overhead than searching each of the plurality of field values separately. However, determining boundaries between adjacent field values stored in concatenation 300 may be problematic. Thus, searching concatenation 300 may involve maintaining information regarding the boundaries between adjacent field values in concatenation 300. FIG. 4 depicts an example approach for generating a data structure comprising length and offset information. In the example of FIG. 4, boundary mapping 400 is generated based on field 102B. Boundary mapping 400 includes length information 402 and offset information 404 for a plurality of field values 408A-Z in field 102B.

Boundary mapping 400 may include length information 402 and/or offset information 404 for a subset of the plurality of field values. For example, a CLA that is generated based on the twenty-six field values of field 102B may be declared as "CLA[27]=[0][3][6][11][14][17] . . . [97][102]". The CLA may have an extra entry at the end that indicates a total length and/or an ending position. Each entry in the CLA other than the extra entry may indicate a starting position. Thus, length information 402 for a value may be determined by subtracting a starting position for the value from a starting/ending position indicated by an immediately subsequent entry. For example, "HORSE" corresponds to the twenty-sixth entry in the CLA, which indicates a starting byte position of "97". The immediately subsequent entry indicates an ending byte position of "102". By subtracting "97" from "102", "HORSE" is determined to have a length of five bytes.

Length information 402 may be maintained in boundary mapping 400 and/or another data structure. For example, length information 402 may be maintained in an in-memory data stream. To reduce a memory footprint of a CLA, offset information 404 may be maintained for a subset of the field values contiguously stored as concatenation 300. When boundary mapping 400 is missing offset information 404 for any value in concatenation 300, length information 402 may be maintained in a separate data structure. For example, the CLA that is generated based on the plurality of field values 408A-Z of field 102B may alternatively be represented as "CLA[14]=[0][6][14] . . . [102]", which stores byte offsets for every other value. Since the CLA is missing entries for "DOG" and "MOUSE", length information 402 for each value may be maintained separately as "[3][3][5][3][3][5] . . . [5]" in a length mapping. Thus, if "OG" corresponds to starting byte offset "4", the CLA indicates that "OG" is located between the first and second entries, and length information 402 indicates that "OG" is located in the second value. In this example, boundary mapping 400 may include the CLA and the length mapping.

Offset information 404 may be a single position (e.g., a starting position or an ending position) for each of a subset of a plurality of field values in a single field. Offset information 404 may be a bit-position, a byte-position, and/or any other information that describes where a particular field value is located in concatenation 300. Offset information 404 may indicate boundaries between the plurality of field values in the single field.

Boundary mapping 400 may be generated at any time relative to generating concatenation 300. In an embodiment, at least a portion of boundary mapping 400 may be generated prior to generating concatenation 300. For example, a length mapping may be generated when field values are stored in body of records 100. In an embodiment, at least a portion of boundary mapping 400 may be generated subsequent to generating concatenation 300. For example, a CLA may be generated after field values are contiguously stored in a memory address space. In an embodiment, at least a portion of boundary mapping 400 may be generated concurrently with generating concatenation 300. For example, field values may be contiguously stored in a memory address space when the field values are stored in body of records 100.

Associating Matches to Records

Figure 5:
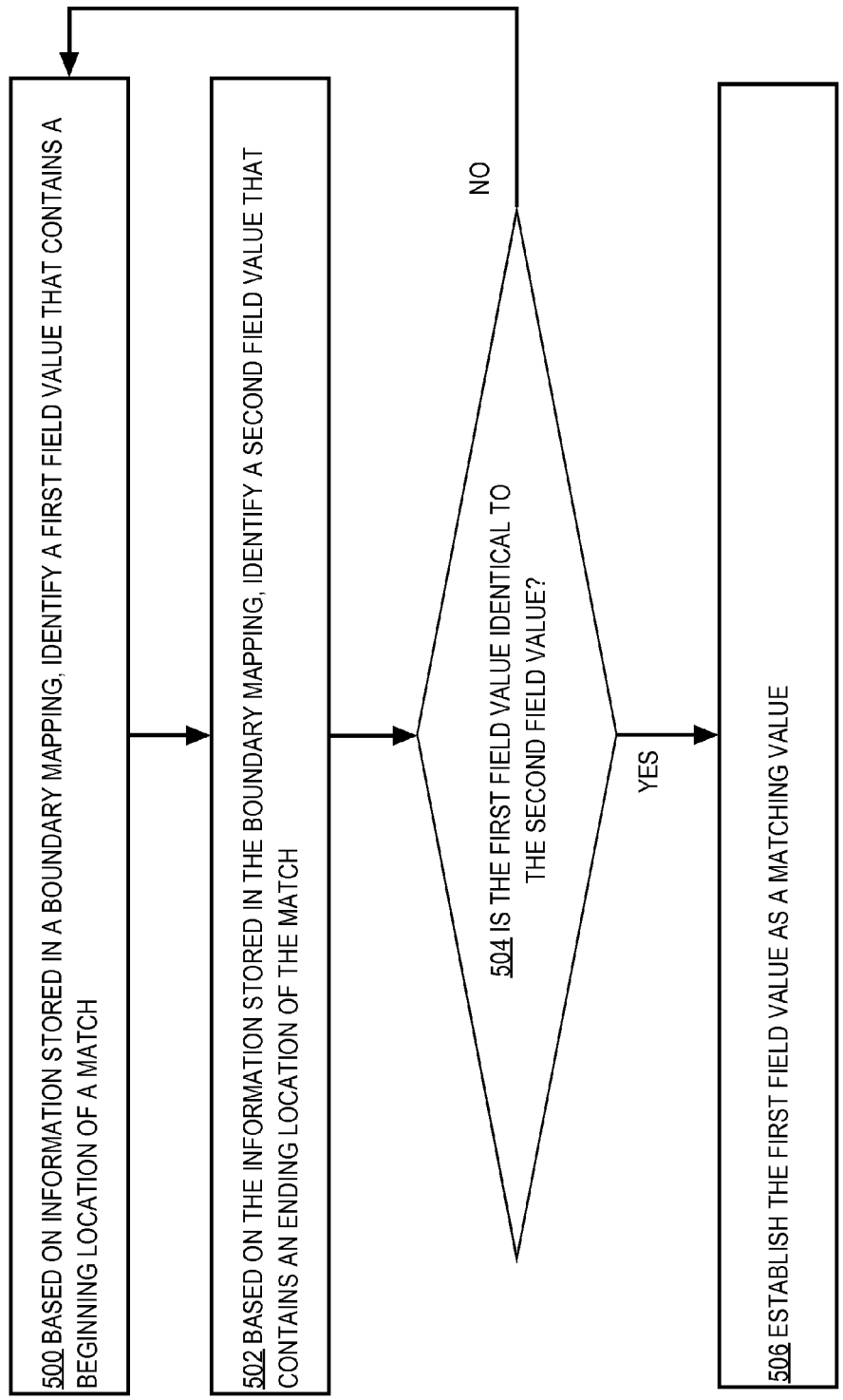
FIG. 5 is a flow diagram that depicts an approach for determining whether a match is contained in a single record.

FIG. 5 is a flow diagram that depicts an approach for determining whether a match is contained in a single record. At blocks 500 and 502, a first field value and a second field value are identified based on information stored in a boundary mapping. The first field value may be identified prior to, concurrently with, and/or subsequent to the identification of the second field value. The first field value may be identified as containing a beginning location of a match, and the second field value may be identified as containing an ending location of a match. In the case of multiple partial patterns, the beginning location of the match may be a beginning location of a first partial pattern, and the ending location of the match may be an ending location of a last partial pattern.

In the example of FIG. 3, the match may correspond to a byte range of "6-10". Thus the beginning location may be byte offset "6", and the ending location may be byte offset "10". A search algorithm may be performed on boundary mapping 400 to identify a pair of consecutive byte offsets that establish a byte range within which either the beginning location or the ending location falls. In other words, the search algorithm may perform the equivalent of solving for "X" in CLA[X]<=Y and Y<CLA[X+1], where "X" indicates a number of an entry in concatenation 300 and "Y" indicates either the beginning location or the ending location. The search algorithm may be a binary search algorithm that repeatedly divides boundary mapping 400 and/or a subset of boundary mapping 400 into halves until the pair of consecutive byte offsets is found. In this example, solving for "X" in CLA[X]<=6 and 6<CLA[X+1] indicates that "X" is equal to "2" and that the beginning location of the match falls within the byte range "6-10" or the third entry in concatenation 300. A similar computation may be performed for the ending location.

At block 504, it is determined whether the first field value is identical to the second field value. If they are identical, block 504 proceeds to block 506. Otherwise, block 504 proceeds to block 500 and/or block 502 so long as the end of concatenation 300 has not been reached. In the example of FIG. 3, the first field value was identified as the third entry in concatenation 300, and the second field value was also identified as the third entry in concatenation 300. Thus, the first field value and the second field value are determined to be identical.

At block 506, the first field value is established as a matching value. Alternatively, the second field value may be established as the matching value, because the first field value and the second field value are identical. In the example of FIG. 3, the third entry of concatenation 300 corresponding to "HORSE" is established as a matching value. If the end of concatenation 300 has not been reached, block 506 may proceed to block 500 and/or block 502.

Example Dictionary-Encoded Optimization

Often, a plurality of field values in a single field of body of records 100 is compressed using dictionary-based compression. Dictionary-based compression enables an optimization that exploits the dictionary used to compress the values. Specifically, under dictionary compression, each of the plurality of field values is represented by a code referred to herein as a token. A token is generally much smaller than the field value represented. An example of a token is an integer, or even a series of bytes that is smaller than a memory word or byte. A dictionary maps each token of a set of tokens to a field value represented by the token; the field value is referred to herein as a base value with respect to the token. For example, a dictionary may map base value "HORSE" to integer 2 and base value "MOUSE" to integer 3.

According to an embodiment, base values of a dictionary are stored as a contiguous set of values and pattern matching is performed on the contiguous set of values instead of the plurality of field values that is compressed by the dictionary. For the base values that match value pattern 208, the dictionary is examined to get a set of matching tokens that corresponds to the base values that match value pattern 208. The set of matching tokens represents the field values that match value pattern 208. The plurality of field values that is compressed using the dictionary is then scanned for tokens that equal a token in the set of matching tokens.

Figure 6:
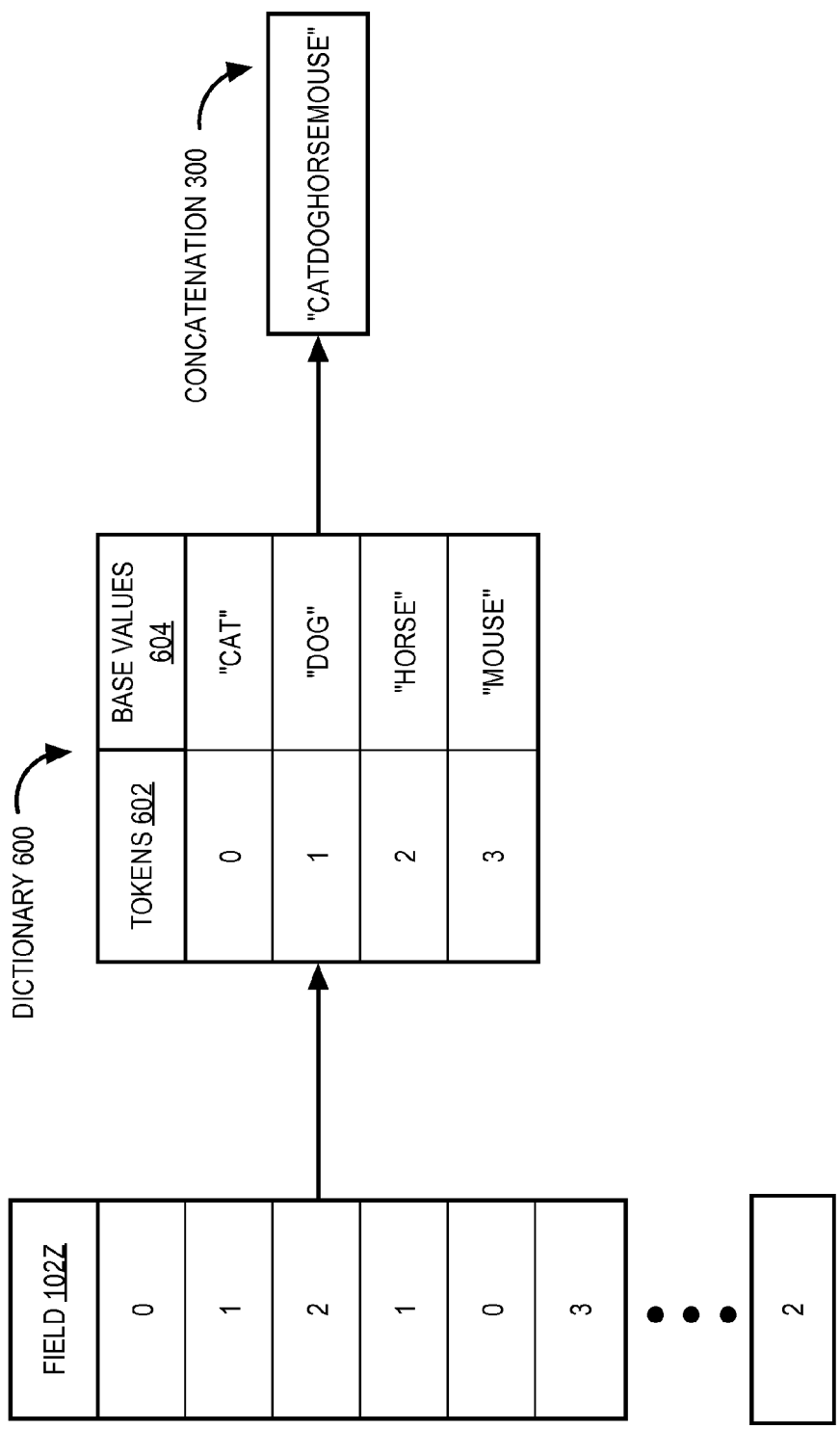
FIG. 6 depicts an example approach for obtaining contiguously stored field values in a compressed format.

FIG. 6 depicts an example approach for obtaining contiguously stored field values in a compressed format, such as a dictionary. In the example of FIG. 6, concatenation 300 may be obtained from field 102Z based on dictionary 600 comprising base values 604 corresponding to tokens 602 in field 102Z.

Dictionary 600 may be a data structure that associates tokens 602 with a plurality of field values. Dictionary 600 may include one or more arrays, one or more vectors, and/or one or more of any other data structures that provide one or more mappings between different bodies of records. For example, dictionary 600 may be a body of records 100 that contains a plurality of records 106A-Z with two fields—a token field for tokens 602 and a base value field for base values 604. Each record of the plurality of records 106A-Z may map a token in the token field to a base value in the base value field. Each token may be a field value in a different body of records, such as a database.

Dictionary 600 may organize records in any structured format, including a tabular format. In an embodiment, dictionary 600 may include base values 604 that are stored contiguously in digital memory. For example, base values 604 may be stored in dictionary 600 at locations within a range of adjacent memory addresses. Obtaining concatenation 300 from dictionary 600 may include copying and/or otherwise processing base values 604 located within the range of adjacent memory addresses.

Tokens 602 may represent hash values, keys, indices, and/or other references to base values 604. Tokens 602 may be representations of base values 604 in a format that has a smaller memory footprint. In the example of FIG. 6, tokens 602 are single-digit numbers that represent base values 604 that are words.

Base values 604 may correspond to a plurality of field values in field 102Z that is stored in dictionary 600. Base values 604 may be a compressed form of the plurality of field values. For example, multiple occurrences of a particular field value may be stored once in dictionary 600. Base values 604 may be stored in dictionary 600 in a sorted order, such as an alphabetical order and/or a numerical order.

Concatenation 300 may be obtained by contiguously storing the plurality of field values in dictionary 600 as base values 604. Pattern-matching algorithm 302 may be performed on base values 604 as described in the previous sections. Based on dictionary 600, base values 604 that match value pattern 208 may be mapped back to a respective field value in body of records 100. For example, if "HORSE" is determined to match value pattern 208, tokens 602 may indicate that rows three and twenty-six of field 102Z match value pattern 208.

Example Pattern-Matching Optimizations

Pattern-matching algorithm 302 may be optimized by intelligently skipping one or more portions of concatenation 300 that are determined to be unable to match at least a portion of value pattern 208. Intelligent skipping may be based on sorting field values prior to contiguously storing the field values as concatenation 300. Additionally or alternatively, intelligent skipping may be based on breaking value pattern 208 into partial patterns and searching for each partial pattern 212 in turn and/or in sequential order 214.

In an embodiment, a plurality of field values in a single field may be sorted, and value pattern 208 may specify a starting value. For example, dictionary 600 may be a dictionary storing base values 604 of "CAT", "DOG", "HORSE", and "MOUSE", and value pattern 208 may be "DO%". Thus, base values 604 with a starting value other than "D" may be skipped. For example, pattern-matching algorithm 302 may search from the beginning of concatenation 300 until starting values stop matching "D".

In an embodiment, value pattern 208 may include two or more partial patterns, and pattern-matching algorithm 302 may alternate between searches for a first partial pattern and a second partial pattern until a match for the first partial pattern and a match for the second partial pattern are found in a single field value and/or a same record. Then, pattern-matching algorithm 302 may search for any successive partial patterns in the single field value and/or the same record where the match for the first partial pattern and the match for the second partial pattern are found so long as matches for the any successive partial patterns are found in the single field value and/or the same record. Otherwise, pattern-matching algorithm 302 resumes alternating between searches for the first partial pattern and the second partial pattern in a subsequent field value and/or a subsequent record.

Figure 7:
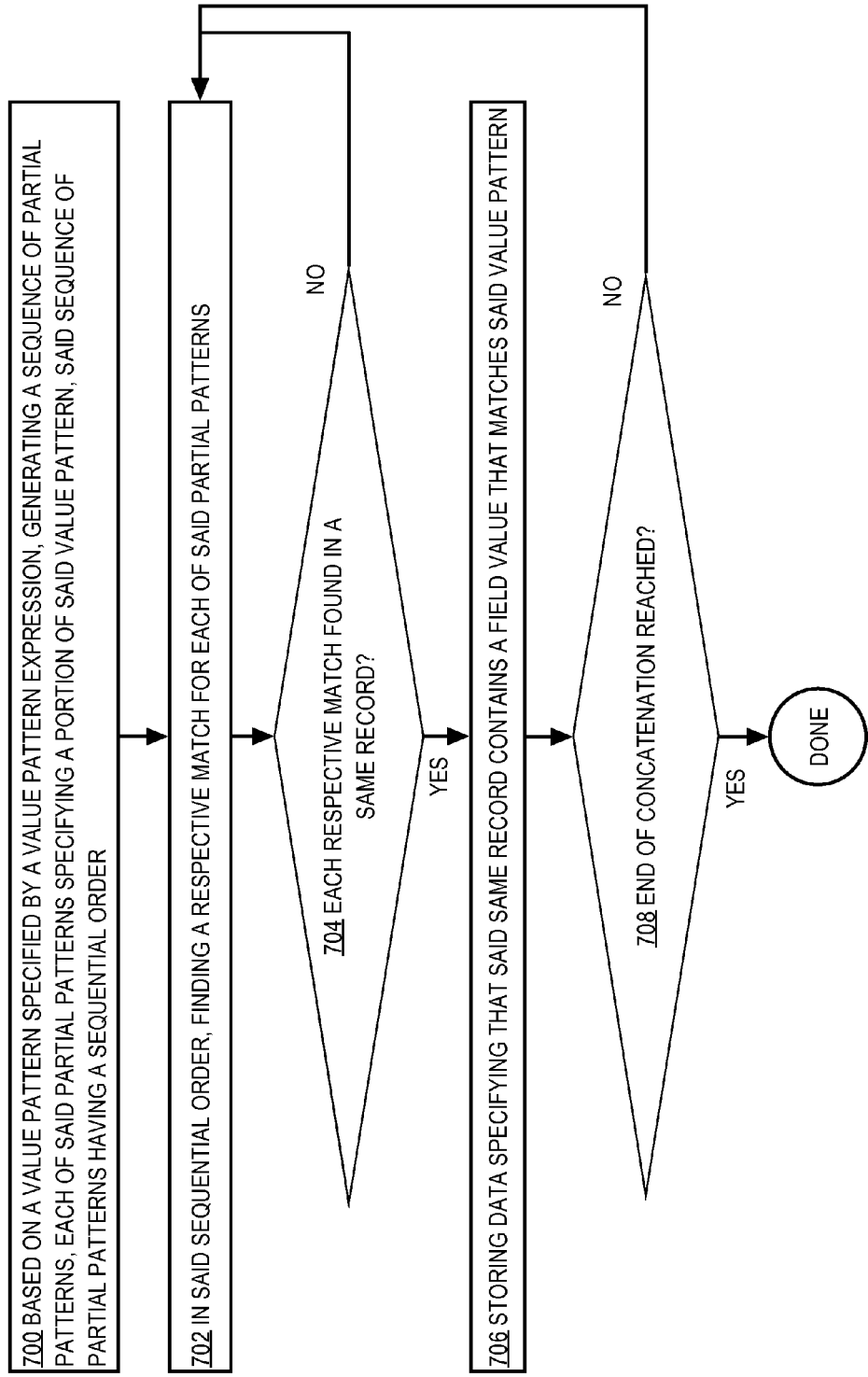
FIG. 7 is a flow diagram that depicts an approach for accelerated detection of matching patterns based on a sequence of partial patterns.

FIG. 7 is a flow diagram that depicts an approach for accelerated detection of matching patterns based on a sequence of partial patterns. At block 700, sequence of partial patterns 210 is generated based on value pattern 208 specified by a value pattern expression, wherein each of the partial patterns specifies a portion of value pattern 208 and wherein sequence of partial patterns 210 has sequential order 214. For example, the value pattern expression "SELECT * FROM table WHERE column LIKE '%HO%SE%AC%RI%'" may include value pattern 208 of "%HO%SE%AC%RI%". Sequence of partial patterns 210 may include a first partial pattern, a second partial pattern, a third partial pattern, and a fourth partial pattern. For example, the first partial pattern may be "HO", the second partial pattern may be "SE", the third partial pattern may be "AC", and the fourth partial pattern may be "RI".

At block 702, a respective match for each of the partial patterns is found in sequential order 214. For example, value pattern 208 of "%HO%SE%AC%RI%" may indicate that a match for "HO" should be found before searching for a match for "SE", a match for "SE" should be found before searching for a match for "AC", and a match for "AC" should be found before searching for a match for "RI". Thus, a single match for each of the partial patterns may be found in turn before proceeding to step 704. Matches for each of the partial patterns may be used to identify a candidate value that matches value pattern 208.

For example, field 102Z may store "HOME", "CAT", "HORSE", "MOUSE", "HORSEBACK", "DOG", and "HORSEBACKRIDING". Although the field values of field 102Z may be contiguously stored as concatenation 300, for the sake of clarity, individual field values will be referenced instead of byte offsets. Pattern-matching algorithm 302 may begin searching for "HO" and "SE" and may find "HO" in "HOME" and "SE" in "HORSE". Since "HO" and "SE" are found in different field values, pattern-matching algorithm 302 may resume searching for "HO".

Pattern-matching algorithm 302 may skip over "CAT", because pattern-matching algorithm 302 already failed to find "SE" in "CAT". Instead, pattern-matching algorithm 302 may resume searching for "HO" in "HORSE". Since "HO" and "SE" are found in a single field value, pattern-matching algorithm 302 may search for "AC" in "HORSE". Since pattern-matching algorithm 302 failed to find "AC" in "HORSE", pattern-matching algorithm 302 may revert to searching for "HO" and "SE".

"HO" is found in "HORSEBACK", so pattern-matching algorithm 302 may skip searching for "SE" in "MOUSE". Instead, pattern-matching algorithm 302 may search for "SE" in "HORSEBACK". Since "HO" and "SE" are found in "HORSEBACK", pattern-matching algorithm 302 may search for "AC" in "HORSEBACK". Since "HO", "SE", and "AC" are found in "HORSEBACK", pattern-matching algorithm 302 may search for "RI" in "HORSEBACK". Failing to find "RI" in "HORSEBACK", pattern-matching algorithm 302 resumes searching for "HO" in "DOG".

Failing to find "HO" in "DOG", pattern-matching algorithm 302 searches for "HO" in "HORSEBACKRIDING". Finding "HO" in "HORSEBACKRIDING", pattern-matching algorithm 302 also searches for "SE" in "HORSEBACKRIDING". Since both "HO" and "SE" are found in "HORSEBACKRIDING", pattern-matching algorithm 302 also searches for "AC" in "HORSEBACKRIDING". Having found each of "HO", "SE", and "AC" in the same field value, pattern-matching algorithm 302 also searches for "RI" in "HORSEBACKRIDING". Having found a match for each of "HO", "SE", "AC", and "RI", a single match for each of the partial patterns 212 has been found in turn and in sequential order 214.

At block 704, a determination is made regarding whether each respective match is found in a same record. The determination may be based on boundary mapping 400 including length information 402 and/or offset information 404 for a plurality of field values in a single field of body of records 100. For example, a binary search may be performed on boundary mapping 400 to identify a corresponding field value for each respective match. If each respective match corresponds to a same field value, block 704 proceeds directly to block 706. Otherwise, block 704 returns to block 702. For example, the candidate value of "HORSEBACKRIDING" includes a match for each of the partial patterns 212. Since the matches were found in a same record, the candidate value is determined to be a matching value.

At block 706, data specifying that the same record corresponds to one of the plurality of field values that matches value pattern 208 is stored. For example, a bit array including entries corresponding to each of the plurality of field values may be generated in digital memory. When one of the plurality of field values that matches value pattern 208 is found, a bit may be set in an entry corresponding to the one of the plurality of field values to indicate that the one of the plurality of field values matches value pattern 208.

At block 708, a determination is made regarding whether a terminal end of concatenation 300 has been reached. For example, the terminal end of concatenation 300 may be indicated by a null byte. If the terminal end has been reached, the process is finished. Otherwise, block 708 returns to block 702 to find another of the plurality of field values that matches value pattern 208.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
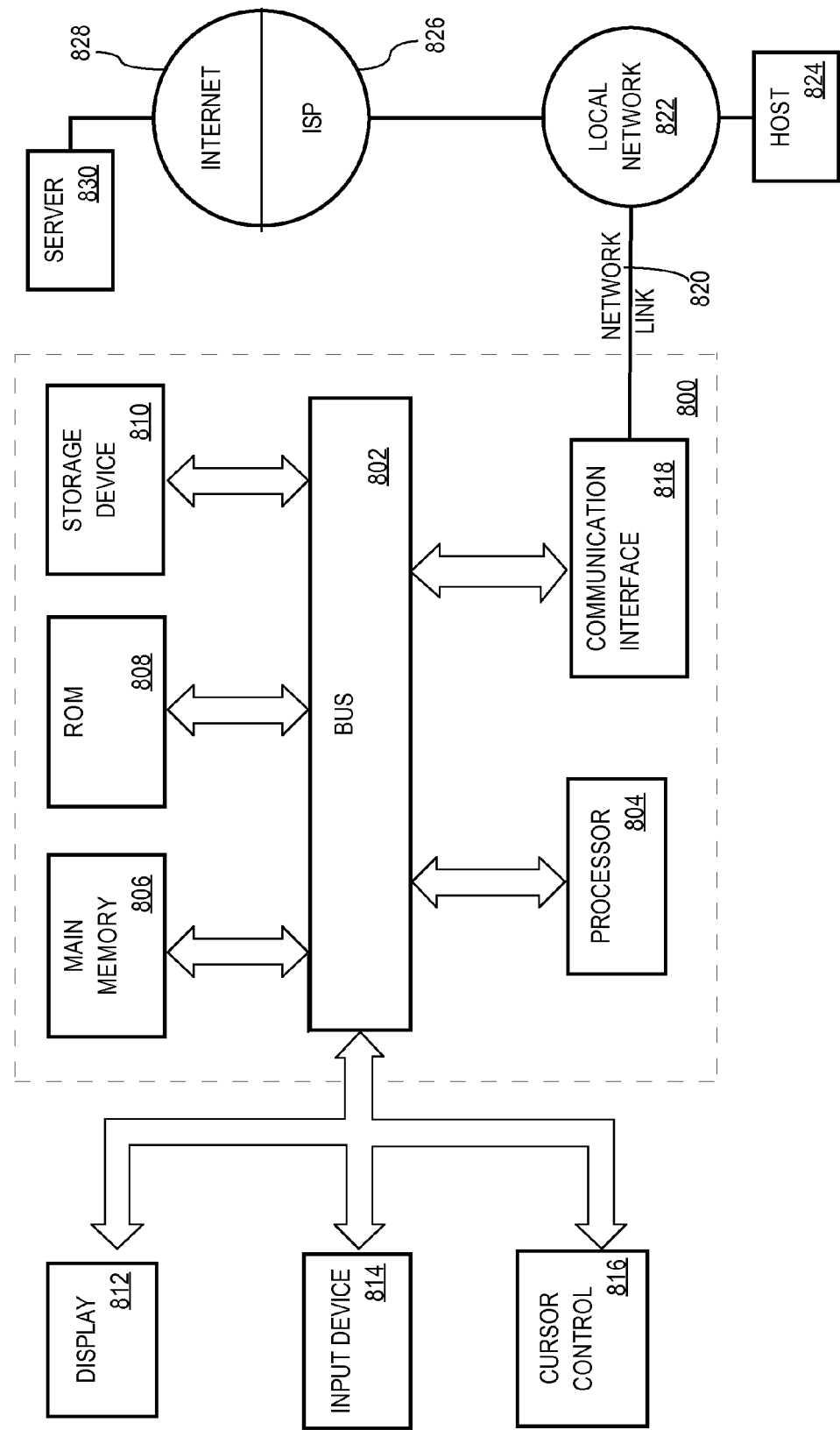
FIG. 8 depicts a computer system upon which an embodiment may be implemented.

For example, FIG. 8 is a block diagram that depicts a computer system 800 upon which an embodiment may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
for a single field of a plurality of records, contiguously storing a plurality of field values from said single field, thereby storing said field values as a concatenation in a memory in a contiguous range of an address space of said memory, wherein each field value of said plurality of field values is from a different record of said plurality of records;
identifying a match in said concatenation that matches a value pattern specified by a value pattern expression;
determining that said match is contained in a single field value of said plurality of field values;
establishing said single field value as a matching value, wherein said method is performed by one or more computing devices.

2. The method of claim 1, wherein determining that said match is contained in said single field value of said plurality of field values comprises finding a particular field value that corresponds to a portion of said match based on searching a data structure comprising length information or offset information for a subset of said field values stored as said concatenation.

3. The method of claim 1, wherein establishing said single field value as said matching value comprises:
obtaining, from a record of said plurality of records that contains said single field value, a code that represents said single field value in a different plurality of records;
identifying one or more records of said different plurality of records that contain said code;
establishing that said one or more records contain said matching value.

4. The method of claim 1, wherein storing said field values as said concatenation comprises sorting said field values prior to contiguously storing said field values.

5. The method of claim 4, wherein identifying said match in said concatenation that matches said value pattern specified by said value pattern expression comprises skipping any portion of said concatenation that is determined, based on said sorting, to be unable to match said value pattern.

6. The method of claim 1, wherein identifying said match in said concatenation that matches said value pattern specified by said value pattern expression comprises skipping any portion of said concatenation that is determined, based on a sequential order indicated by said value pattern, to be unable to match said value pattern.

7. The method of claim 1, wherein identifying said match in said concatenation that matches said value pattern specified by said value pattern expression comprises searching for, in turn, each partial pattern of a plurality of partial patterns of said value pattern.

8. A method comprising:
for a single field of a plurality of records, contiguously storing a plurality of field values from said single field, thereby storing said field values as a concatenation in a memory in a contiguous range of an address space of said memory, wherein each field value of said plurality of field values is from a different record of said plurality of records;
identifying a field value of said plurality of field values in said concatenation that matches a value pattern specified by a value pattern expression, wherein identifying said field value comprises:
based on said value pattern, generating a sequence of partial patterns, each of said partial patterns specifying a portion of said value pattern, said sequence of partial patterns having a sequential order;
in said sequential order, iteratively finding a respective match for each of said partial patterns until each respective match is found in a same record of said plurality of records;
when a respective match for each said partial patterns is found in said same record, storing data specifying that said same record contains said field value that matches said value pattern,
wherein said method is performed by one or more computing devices.

9. The method of claim 8, wherein finding a respective match for each of said partial patterns until each respective match is found in a same record includes searching a data structure comprising length information or offset information for a subset of said field values stored as said concatenation.

10. The method of claim 8, wherein identifying said field value comprises:
obtaining, from said same record of said plurality of records, a code that represents said field value in a different plurality of records;
identifying one or more records of said different plurality of records that contain said code;
establishing that said one or more records of said different plurality of records contain said field value.

11. The method of claim 8, the method further including sorting said field values prior to being stored as said concatenation.

12. The method of claim 11, wherein identifying a field value of said plurality of field values in said concatenation that matches a value pattern includes skipping any portion of said concatenation that is determined, based on said sorting, to be unable to match each of said partial patterns.

13. The method of claim 8, wherein identifying a field value of said plurality of field values in said concatenation that matches a value pattern includes skipping any portion of said concatenation that is determined, based on said sequential order, to be unable to match each of said partial patterns.

14. One or more non-transitory storage media storing instructions which, when processed by one or more computing devices, cause:
for a single field of a plurality of records, contiguously storing a plurality of field values from a single field, thereby storing the field values as a concatenation in a memory in a contiguous range of an address space of said memory, wherein each field value of said plurality of field values is from a different record of said plurality of records;
identifying a match in said concatenation that matches a value pattern specified by a value pattern expression;
determining that said match is contained in a single field value of said plurality of field values;
establishing said single field value as a matching value.

15. The one or more non-transitory storage media of claim 14, wherein determining that said match is contained in said single field value of said plurality of field values comprises finding a particular field value that corresponds to a portion of said match based on searching a data structure comprising length information or offset information for a subset of said field values stored as said concatenation.

16. The one or more non-transitory storage media of claim 14, wherein establishing said single field value as said matching value comprises:

obtaining, from a record of said plurality of records that contains said single field value, a code that represents said single field value in a different plurality of records;

identifying one or more records of said different plurality of records that contain said code;

establishing that said one or more records contain said matching value.

17. The one or more non-transitory storage media of claim 14, wherein storing said field values as said concatenation comprises sorting said field values prior to contiguously storing said field values.

18. The one or more non-transitory storage media of claim 17, wherein identifying said match in said concatenation that matches said value pattern specified by said value pattern expression comprises skipping any portion of said concatenation that is determined, based on said sorting, to be unable to match said value pattern.

19. The one or more non-transitory storage media of claim 14, wherein identifying said match in said concatenation that matches said value pattern specified by said value pattern expression comprises skipping any portion of said concatenation that is determined, based on a sequential order indicated by said value pattern, to be unable to match said value pattern.

20. The one or more non-transitory storage media of claim 14, wherein identifying said match in said concatenation that matches said value pattern specified by said value pattern expression comprises searching for, in turn, each partial pattern of a plurality of partial patterns of said value pattern.

21. One or more non-transitory storage media storing instructions, which when processed by one or more computing devices, cause:

for a single field of a plurality of records, contiguously storing a plurality of field values from said single field, thereby storing said field values as a concatenation in a memory in a contiguous range of an address space of said memory, wherein each field value of said plurality of field values is from a different record of said plurality of records;

identifying a field value of said plurality of field values in said concatenation that matches a value pattern specified by a value pattern expression, wherein identifying said field value comprises:

based on said value pattern, generating a sequence of partial patterns, each of said partial patterns specifying a portion of said value pattern, said sequence of partial patterns having a sequential order;

in said sequential order, iteratively finding a respective match for each of said partial patterns until each respective match is found in a same record of said plurality of records; and when a respective match for each said partial patterns is found in said same record, storing data specifying that said same record contains said field value that matches said value pattern.

22. The one or more non-transitory storage media of claim 21, wherein finding a respective match for each of said partial patterns until each respective match is found in a same record includes searching a data structure comprising length information or offset information for a subset of said field values stored as said concatenation.

23. The one or more non-transitory storage media of claim 21, wherein identifying said field value comprises:

obtaining, from said same record of said plurality of records, a code that represents said field value in a different plurality of records; identifying one or more records of said different plurality of records that contain said code;

establishing that said one or more records of said different plurality of records contain said field value.

24. The one or more non-transitory storage media of claim 21, wherein the instructions include instructions that, when processed by said one or more computing devices, cause sorting said field values prior to being stored as said concatenation.

25. The one or more non-transitory storage media of claim 24, wherein identifying a field value of said plurality of field values in said concatenation that matches a value pattern includes skipping any portion of said concatenation that is determined, based on said sorting, to be unable to match each of said partial patterns.

26. The one or more non-transitory storage media of claim 21, wherein identifying a field value of said plurality of field values in said concatenation that matches a value pattern includes skipping any portion of said concatenation that is determined, based on said sequential order, to be unable to match each of said partial patterns.

* * * * *